(12) United States Patent
Tsai

(10) Patent No.: US 8,578,841 B2
(45) Date of Patent: Nov. 12, 2013

(54) ENCRUSTING MACHINE

(75) Inventor: Cheng-Yen Tsai, Tainan (TW)

(73) Assignee: Hundred Machinery Enterprise Co., Ltd., Tainan (TW)

( * ) Notice: Subject to any disclaimer, the term of this patent is extended or adjusted under 35 U.S.C. 154(b) by 512 days.

(21) Appl. No.: 12/905,262

(22) Filed: Oct. 15, 2010

(65) Prior Publication Data

US 2012/0090477 A1    Apr. 19, 2012

(51) Int. Cl.
*A21C 9/06*    (2006.01)

(52) U.S. Cl.
USPC .......................... 99/450.6; 99/450.7; 99/450.8

(58) Field of Classification Search
USPC .................................. 99/450.6, 450.7, 450.8
See application file for complete search history.

(56) References Cited

U.S. PATENT DOCUMENTS 5,967,025 A * 10/1999 Tashiro ........................ 99/450.2

* cited by examiner

*Primary Examiner* — Tu B Hoang
*Assistant Examiner* — Lindsey C Teaters
(74) *Attorney, Agent, or Firm* — Rosenberg, Klein & Lee

(57) ABSTRACT

An encrusting machine is revealed. The encrusting machine mainly includes a power source disposed on a power unit of a machine body. A force output end of the power source is disposed with a first drive belt for driving a cut unit and a second drive belt for driving a food receiving unit. A plurality of cutting blades is mounted in a cutting opening on a middle part of a cut-off base of the cut unit. The blades are controlled by the power unit and vertical movement of the cut-off base is also controlled by the power unit. In the food receiving unit, a toggle set on a cam is used to control vertical movement of a catch basin on top of a push set. The structure is simplified so that the machine is with reduced cost, easy assembly, reduced failure rate reduced, convenient maintenance and high practicality.

6 Claims, 8 Drawing Sheets

ENCRUSTING MACHINE

BACKGROUND OF THE INVENTION

1. Field of the Invention

The present invention relates to an encrusting machine, especially to an encrusting machine with simple structure so that the cost is reduced, the assembly is fast, the failure rate is reduced dramatically and the maintenance is more convenient. Thus the practicality of the machine with novel design is enhanced.

2. Description of Related Art

While producing steamed stuffing buns or stuffing cakes, encrusting machines are used to fill the stuffing. A common encrusting machine, as revealed in Taiwanese Pub. No. 589146, drive mechanism for food shaping machine published on Jun. 1, 2004, inside a machine, there is a plurality of parts. A main shaft driven by a single motor drives a driving member connected on top thereof, a transverse drive shaft engaged horizontally, and a cam connected to the transverse drive shaft. A cutting device consists of a plate and a plurality of knives sliding inside a sliding slot of the plate. The above drive members are used to drive the knives to slide in the sliding slot so that an insertion hole formed by the surrounding the knives is closed and opened. Blades of the knives cut off cylinder passing the insertion hole. Two ends of a rocker are joined loosely between a base of the cutting device and the transverse drive shaft for control of the vertical movement of the cutting device. A top connection part includes a top plate located under the insertion hole and connected with a sliding plate on the bottom end thereof and the sliding plate has a connection end on its bottom end. A rocker set driven by the cam is composed of an upper link with one end joined loosely to a fixed axis so as to rotate around the fixed axis. The other end of the upper link is joined loosely with one end of a vertical link. A small pulley is arranged at one side of the upper link so as to make the upper link become an elastic element. A spring includes one end fixed on the machine to form a fixed end while the other end is connected to the upper link. A lower link has one end joined loosed to the bottom end of the vertical link while the other end thereof is connected to the connection end of the sliding plate. The small pulley is driven by a projecting end of the cam so as to drive the sliding plate moving vertically. A distance adjusting device is formed by a rocker set and having a lower link whose one end is connected moveably to the fixed axis so as to rotate around the fixed axis while the other end is connected moveably to the bottom end of a vertical link. The top of this vertical link is connected moveably to one end of an upper link while the other end of the upper link is joined loosely to an inner link and the bottom end of the inner link is connected to a worm gear. A long rod extended out of the machine includes a worm engaged with the worm gear. The two lower links are connected by a connection axis so as to form a reference point. By the engagement between the worm and the worm gear, the upper position and the lower position of the reference point are controlled so as to further control the upper dead-center position and the lower dead-center position of the top plate.

Although the above drive mechanism food shaping machines uses only a single motor to control the whole driving movement. In practice, the completed structure and multiple components cause the increasing of the manufacturing cost. The assembly is quite slow, inconvenient and time-consuming. Moreover, the failure rate is high and the maintenance is difficult. Thus there is a need to improve the structure of the machine.

SUMMARY OF THE INVENTION

Therefore it is a primary object of the present invention to provide an encrusting machine in which all components are with simple structure so that the manufacturing cost is reduced. Moreover, the assembly is easier and faster, the failure rate is reduced and the maintenance is more convenient. The practicality and convenience of the machine are enhanced.

In order to achieve the above object, an encrusting machine of the present invention includes a machine body, and a power unit with a power source disposed on the machine body. A force output end of the power source is disposed with a first drive belt and a second drive belt while the first drive belt drives a cut unit to act and the second drive belt drives a food receiving unit to move. The cut unit includes a cut-off base with a cutting opening on a middle part thereof and a plurality of cutting blades is mounted in the cutting opening. The blades are controlled by the power unit and the cut-off base is driven by the power unit to move vertically. In the food receiving unit, there is a time difference between the movement of a cam and the cut unit so that a toggle set on the cam is used to control vertical movement of a catch basin on top of a push set.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
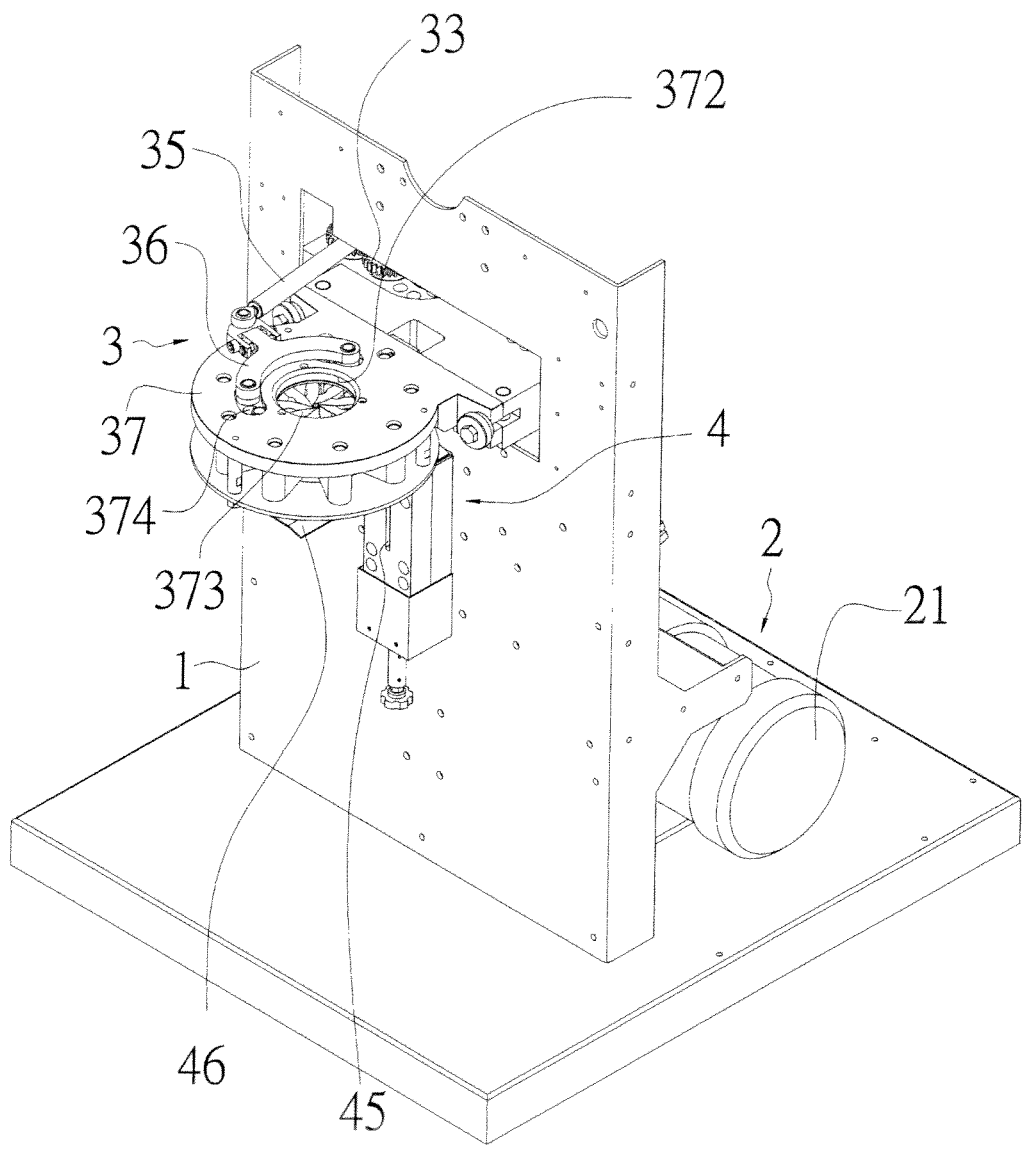
FIG. 1 is a front perspective view of an embodiment according to the present invention.
Figure 2:
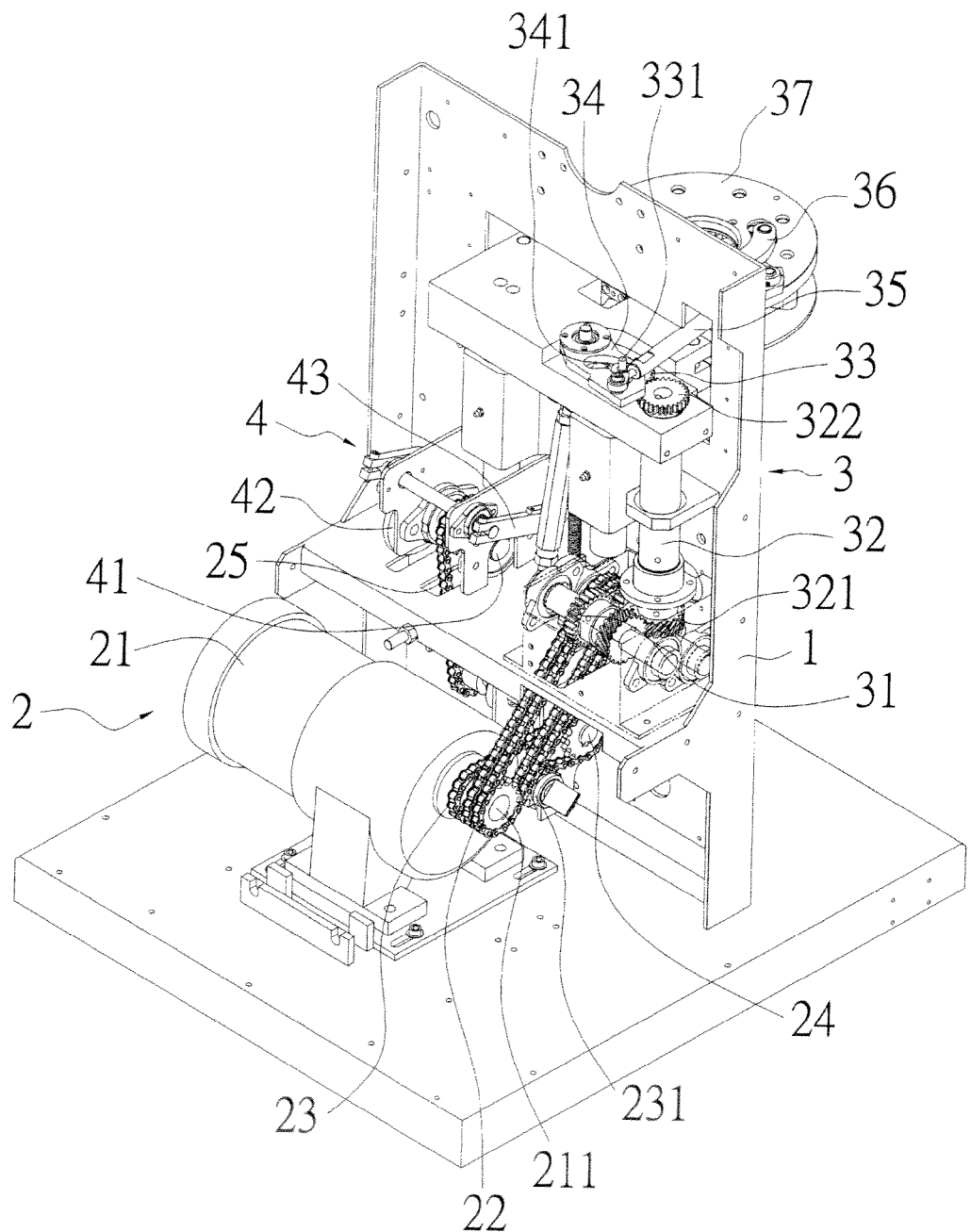
FIG. 2 is a rear perspective view of an embodiment according to the present invention.
Figure 3:
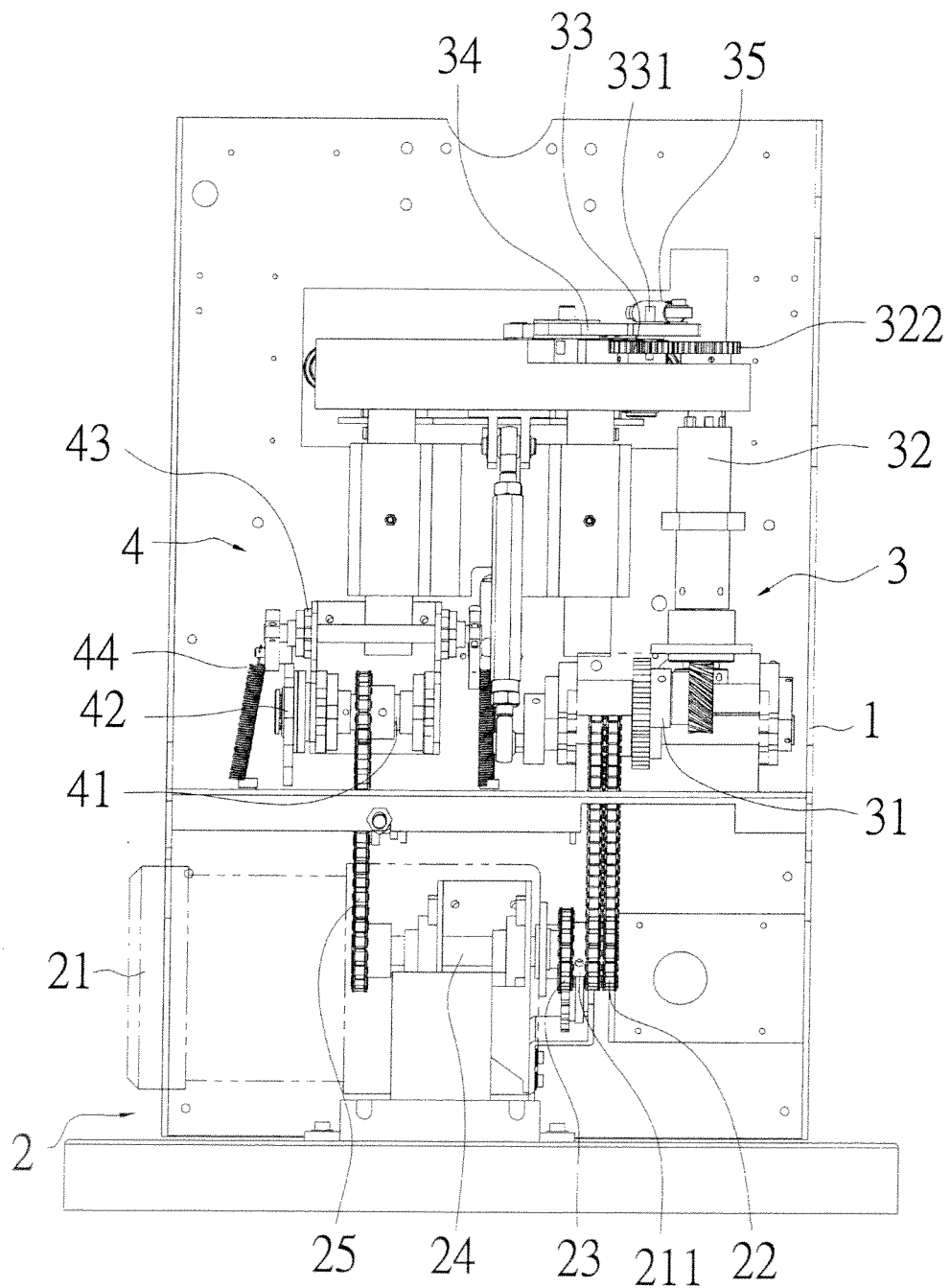
FIG. 3 is rear view of an embodiment according to the present invention.

Refer to FIG. 1 FIG. 2 and FIG. 3, an encrusting machine of the present invention includes a power unit 2 that is disposed on one side of a machine body 1, a cut unit 3 and a food receiving unit 4 both arranged at the other side of the machine body 1.

The power unit 2 includes a power source 21 in which a first drive belt 22 and a second drive belt 23 are disposed on a force output end 211 of the power source 21. The first drive belt 22 drives the cut unit 3 to move and the second drive belt 23 is linked to one end of a shaft 24 while the other end of the shaft 24 is arranged with a third drive belt 25. The third drive belt 25 drives the food receiving unit 4 to act.

Figure 4:
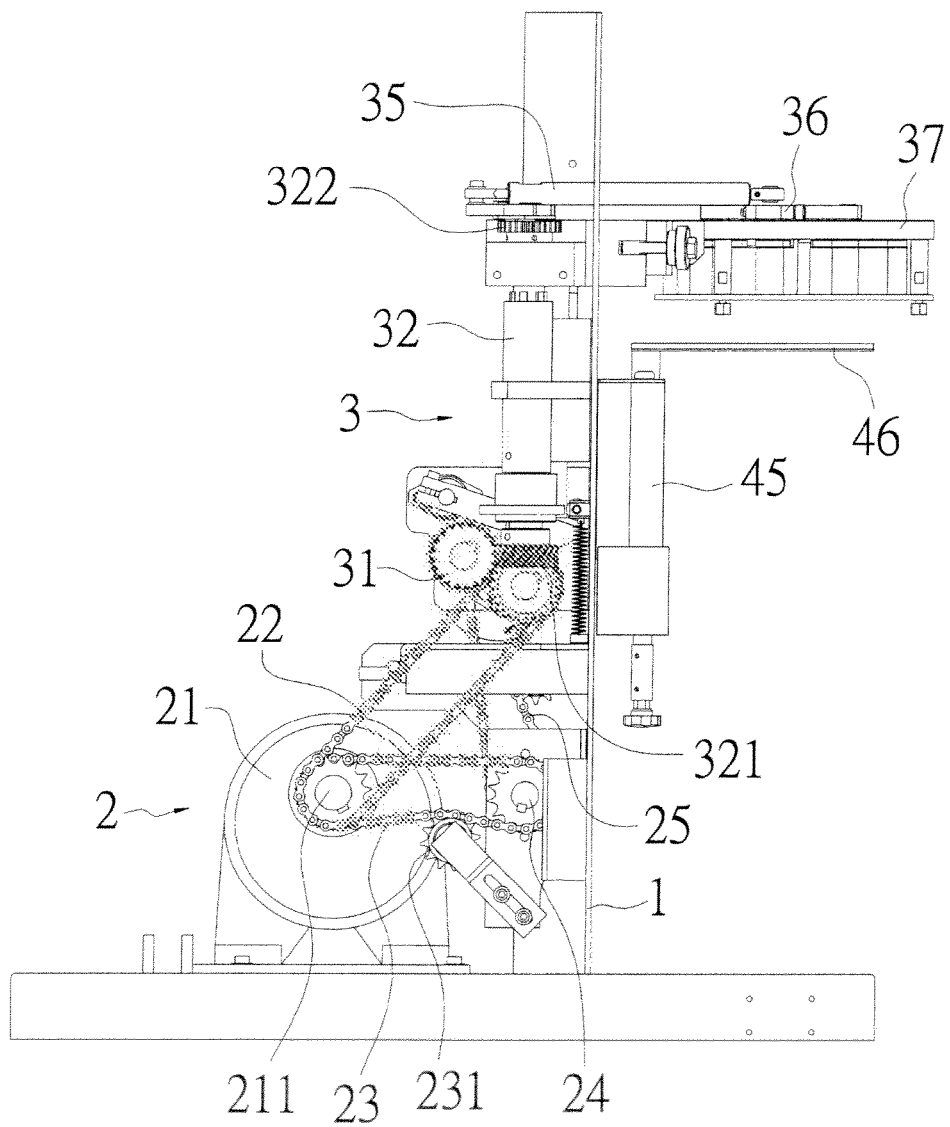
FIG. 4 is a side view of an embodiment according to the present invention.
Figure 5:
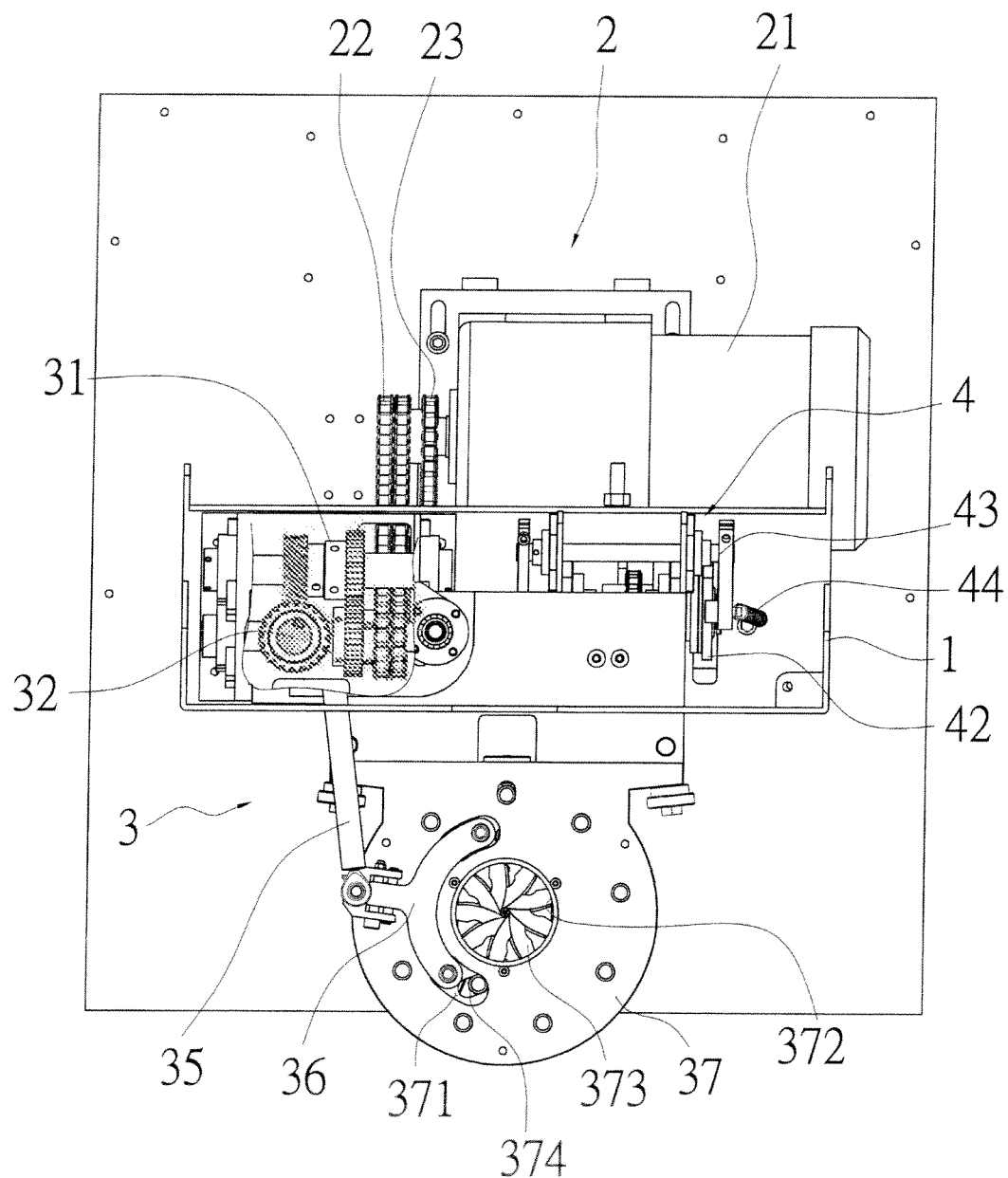
FIG. 5 is a top view of a partial cross sectional view of an embodiment according to the present invention.
Figure 6:
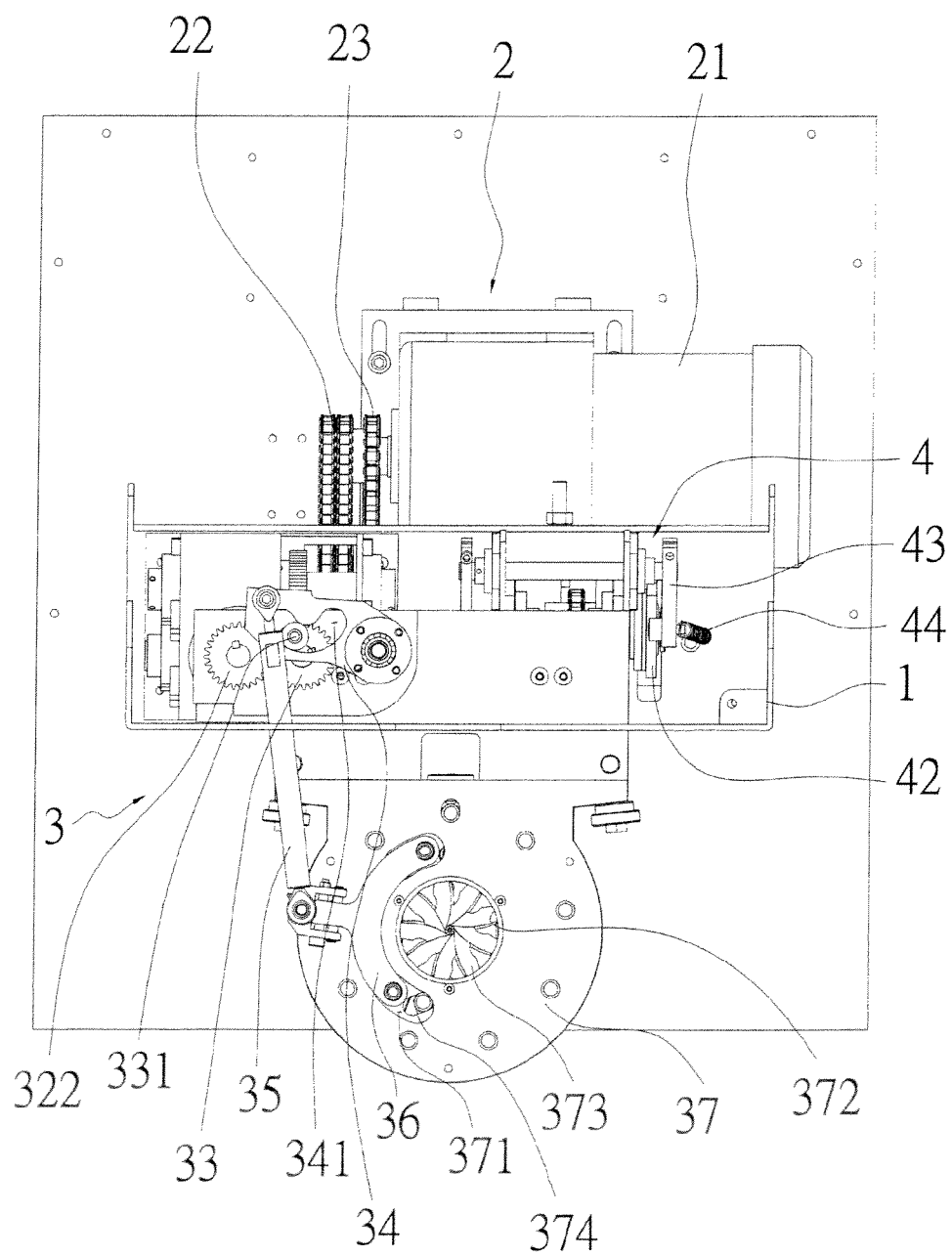
FIG. 6 is a top view of an embodiment according to the present invention.
Figure 7:
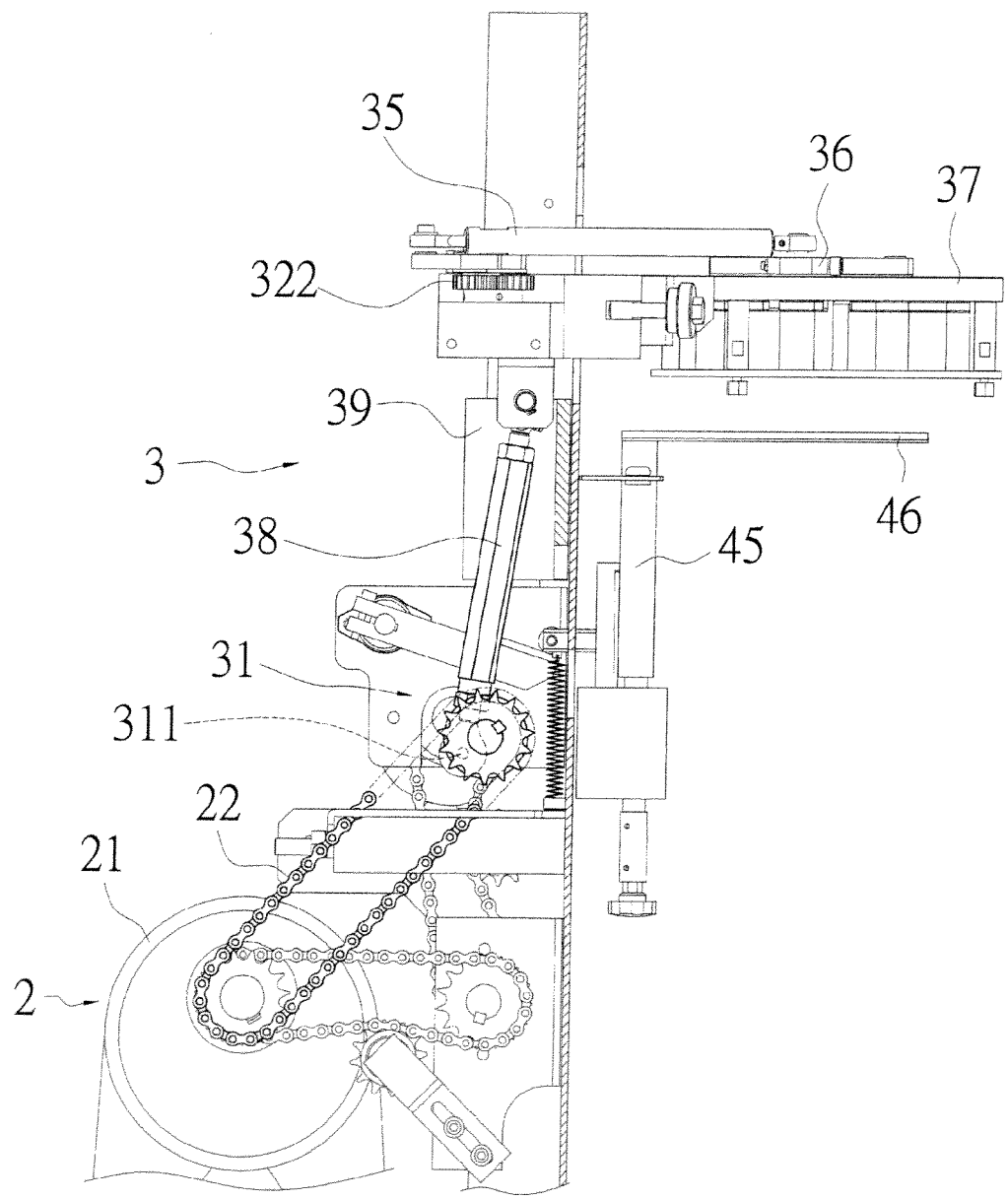
FIG. 7 is a partial side view of an embodiment according to the present invention.

Refer to FIG. 4, FIG. 5 and FIG. 6, the cut unit 3 consists of a connection gear set 31 corresponding to the first drive belt 22 of the power unit 2. The connection gear set 31 is engaged with a bottom gear 321 on the bottom of a driving axis 32. A top gear 322 is arranged at the top of the driving axis 32 and is meshed with a drive gear 33. The drive gear 33 is arranged with an eccentric rod 331 that is corresponding to a dial piece 34 with a curved slot 341. The eccentric rod 331 can move within the curved slot 341. Moreover, a push arm 35 is pivoted movably on the dial piece 34 and the other end of the push arm 35 is pivoted and connected to a link member 36. A cut-off base 37 is disposed on the machine body 1, at the position corresponding to the link member 36. The cut-off base 37 is mounted with a sliding groove 371 corresponding to the link member 36 so that the link member 36 slides and moves within the sliding groove 371. The cut-off base 37 further includes a cutting opening 372 on a middle part thereof and a plurality of cutting blades 373 is mounted in the cutting opening 372 movably. The cutting blades 373 are under control of a controller 374 projecting from the sliding groove 371. Refer to FIG. 7, an eccentric axis 311 is disposed on one side of the connection gear set 31 and is pivoted and connected with a linkage 38 and the linkage 38 is connected to the cut-off base 37. A buffer part 39 is arranged between the cut-off base 37 and the machine body 1.

Figure 8:
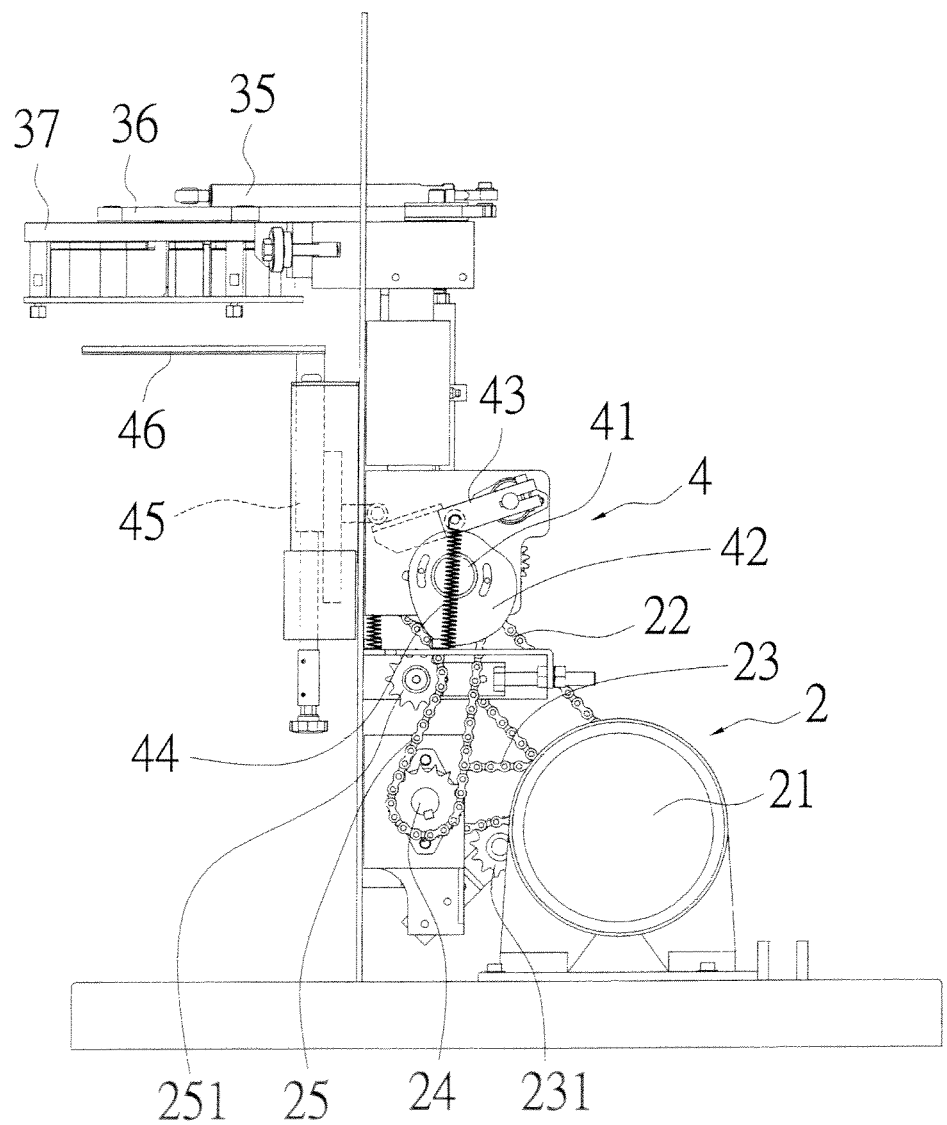
FIG. 8 is the other side view of an embodiment according to the present invention.

Refer to FIG. 8, the other side view of the present invention is revealed. The food receiving unit 4 includes a driving shaft 41 corresponding to the third drive belt 25 of the power unit 2. An outer side of the driving shaft 41 is connected to a cam 42 with a toggle set 43. An elastic element 44 is disposed between the toggle set 43 and the machine body 1 and the toggle set 43 turns back to the original position by elastic force of the elastic element 44. A push set 45 is corresponding to the toggle set 43 and the top of the push set 45 is disposed with a catch basin 46 corresponding to the bottom of the cut-off base 37 of the cut unit 3.

Refer to FIG. 4, the second drive belt 23 of the power unit 2 is arranged with a press gear 231 and the third drive belt 25 is also disposed with a press gear 251. By the press gear 231 and the press gear 251, the second drive belt 23 and the third drive belt 25 are pressed tightly so as to prevent the second drive belt 23 or the third drive belt 25 from loosening or falling.

While in use, the force output end 211 of the power source 21 of the power unit 2 respectively drives the first drive belt 22 and the second drive belt 23. The first drive belt 22 further drives the cut unit 3 to move while the second drive belt 23 drives the food receiving unit 4 to act through the shaft 24 and the third drive belt 25. After the connection gear set 31 of the cut unit 3 being driven by the first drive belt 22, the connection gear set 31 drives the driving axis 32 to rotate through the bottom gear 321. During the rotation of the driving axis 32, the top gear 322 on top of the driving axis 32 drives the drive gear 33 to rotate. Next by the eccentric rod 331 of the drive gear 33 moves inside the curved slot 341 of the dial piece 34, the dial piece 34 is driven by the eccentric rod 331 so as to push the push arm 35 pivoted on the dial piece 34. Thus the link member 36 on the other end of the push arm 35 slides in the sliding groove 371 of the cut-off base 37 and the controller 374 in the sliding groove 371 also moves. Therefore, the cutting blades 373 in the cutting opening 372 of the cut-off base 37 do the cutting. At the same time, the eccentric axis 311 on one side of the connection gear set 31 also drives the linkage 38 pivoted moving vertically so that the cut-off base 37 connected to the linkage 38 is also driven to move vertically. During the vertical movement, the cut-off base 37 is supported and buffered by the buffer part 39. During the cutting process of the cut unit 3, through the driving shaft 41 of the food receiving unit 4, the third drive belt 25 drives the cam 42 to rotate. There is a time difference between the movement of the cam 42 and the cutting of the cut unit 3. While the cam 42 rotating, the toggle set 43 is pushed upward so that the toggle set 43 drives the catch basin 46 moving vertically through the push set 45.

In summary, compared with the structure available now, the structure of components of the present invention is simplified so that the manufacturing cost is down. Moreover, the assembly is easier and faster. The failure rate is reduced and the maintenance is more convenient. Thus the practicality and convenience of the device are improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An encrusting machine comprising a machine body, a power unit disposed on the machine body, a cut unit and a food receiving unit both fixed to the machine body; wherein
the power unit is disposed with a power source and a force output end of the power source is disposed with a first drive belt and a second drive belt; the first drive belt drives the cut unit to move and the second drive belt drives the food receiving unit to act;
the cut unit having a cut-off base with a cutting opening on a middle part thereof, and a plurality of cutting blades mounted moveably in the cutting opening; the cutting blades are controlled by the power unit and vertical movement of the cut-off base is also driven by the power unit;
the food receiving unit includes a driving shaft corresponding to the power unit and an outer side of the driving shaft is connected to a cam with a toggle set; an elastic element is disposed between the toggle set and the machine body; a push set is arranged corresponding to the toggle set and the top of the push set is disposed with a catch basin corresponding to the bottom of the cut-off base of the cut unit.

2. The device as claimed in claim 1, wherein the second drive belt of the power unit is linked to a shaft while the other end of the shaft is connected to a third drive belt and the third drive belt drives the food receiving unit to move.

3. The device as claimed in claim 1, wherein the cut unit includes a connection gear set corresponding to the power unit; the connection gear set is engaged with a bottom gear on the bottom of a driving axis while a top gear is arranged at the top of the driving axis and the top gear is meshed with a drive gear; the drive gear is arranged with an eccentric rod that is corresponding to a dial piece with a curved slot; the eccentric rod moves within the curved slot; a push arm is pivoted movably on the dial piece and the other end of the push arm is pivoted and connected to a link member; the cut-off base is disposed on the machine body and is mounted with a sliding groove corresponding to the link member so that the link member slides and moves within the sliding groove; the movement of the cut-off base is controlled by a controller projecting from the sliding groove.

4. The device as claimed in claim 3, wherein an eccentric axis is disposed on one side of the connection gear set and is pivoted and connected with a linkage and the linkage is connected to the cut-off base while a buffer part is arranged between the cut-off base and the machine body.

5. The device as claimed in claim 1, wherein the second drive belt of the power unit is arranged with a press gear.

6. The device as claimed in claim 2, wherein the third drive belt of the power unit is disposed with a press gear.

* * * * *